Figure 1:
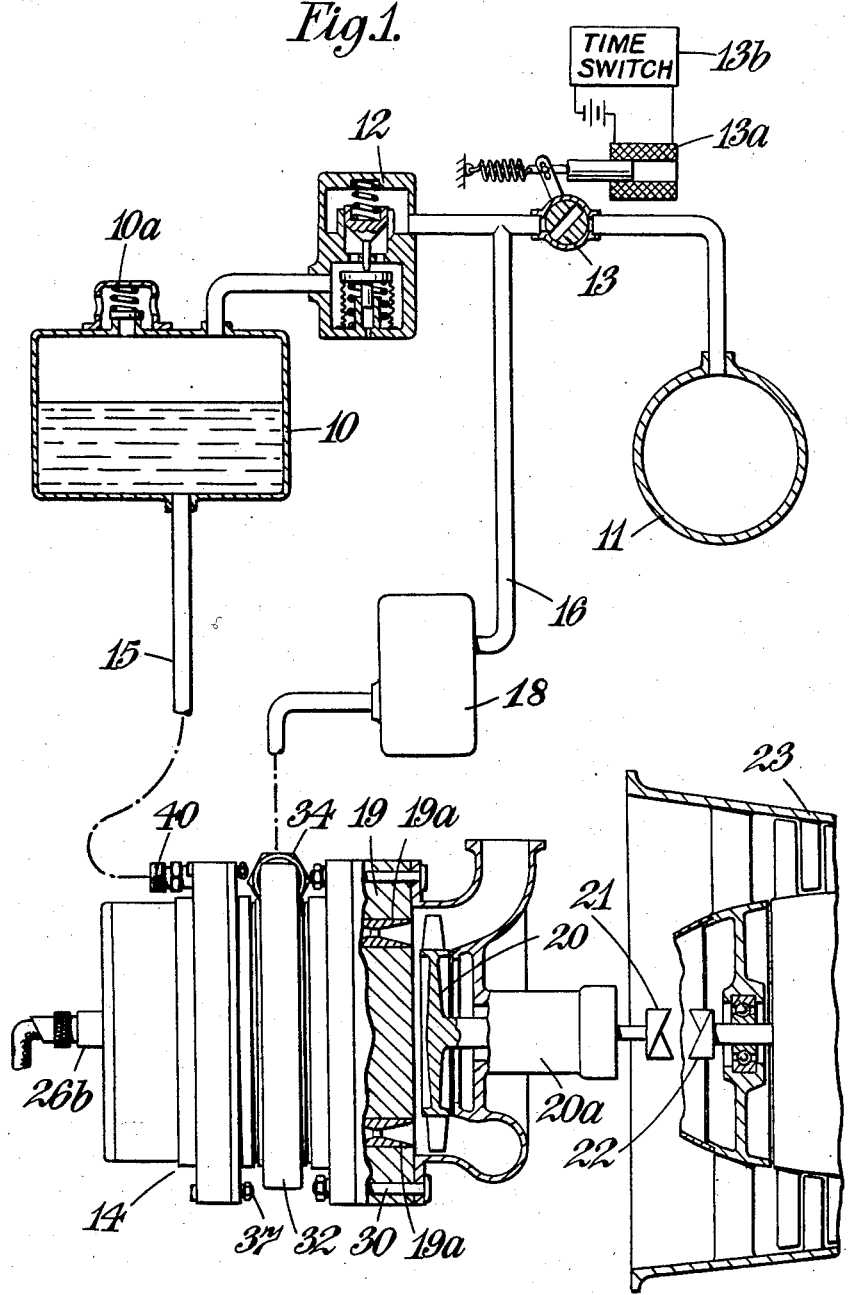

United States Patent Office 2,872,782
Patented Feb. 10, 1959

2,872,782

STARTERS FOR PRIME MOVERS

Francis Murray Johnson, London, and Vernon Wallace Greenhough, Derby, England, assignors to Rolls-Royce Limited, Derby, England, a British company Application November 15, 1954, Serial No. 468,962

Claims priority, application Great Britain December 11, 1953

1 Claim. (Cl. 60—39.14)

This invention relates to starters for prime movers and is concerned more specifically with combustion starters, that is starters wherein fuel is burnt with air to provide a working fluid which is used, for instance, to operate a turbine which cranks the prime mover to be started.

With combustion starters a continuous supply of combustion air under pressure is not always available, and therefore the combustion air may be derived from an air bottle wherein air is stored under high pressure. Since, for starters used with aircraft at least, the air bottle must be kept as light as possible and should contain sufficient air for a number of starts without being recharged, it is essential that economical use of the air be ensured in the combustion chamber of the starter.

For this reason, it is arranged in some known combustion starters that the fuel and air are fed to the combustion chamber of the combustion starter in approximately stoichiometric ratio and the products of combustion are led direct to operate the turbine or other motor, whereby the prime mover is cranked. This arrangement suffers from the disadvantage that due to the high temperature of the combustion gases overheating of the starter may occur thus preventing repeated starts and also reducing the life of the apparatus.

This invention has for an object to avoid this difficulty whilst obtaining economy of use of the combustion air.

According to the present invention, a combustion starter is arranged for combustion of the air and fuel in approximately the stoichiometric ratio and has means to inject further fuel into the combustion products to cool them prior to their use to produce a cranking torque. The amount of further fuel injected is such as to reduce substantially the air/fuel ratio from the stoichiometric value of the ratio; for instance if the stoichiometric air/fuel ratio is 15:1, then the quantity of further fuel injected may conveniently be such as to reduce the ratio to 3:1.

The vaporization of the additional fuel substantially cools the combustion products so that repeated starts can be made and damage by overheating can be avoided.

According to a feature of this invention, the combustion fuel and further fuel may be injected through the same fuel injectors. For instance, a fuel injector may be formed as a perforated tube, the combustion air being led into the combustion chamber past a small number of the perforations in the tube to have the combustion fuel fed into it, and the combustion products being led past the remainder of the perforations to have the extra fuel injected into them.

In one preferred arrangement according to this feature of the invention, the combustion chamber comprises an outer cup-like casing and an inner cup-like casing which are nested with their walls and bases spaced and with their rims in sealed engagement so that the space between the walls is closed, an annular air manifold connected to feed air into the space adjacent the rims, and a fuel manifold encircling the outer casing at about its mid length, the perforated tubes extending radially from the fuel manifold across the space between the walls and projecting into the inner casing, the base of the inner casing being perforated and the air flowing in said space past the tubes to receive the combustion fuel and then turning into a reverse path to pass into the inner casing through its perforated base, which acts as a combustion stabiliser, so that in the inner casing, combustion occurs at the base end and the combustion products flow past the inner ends of the fuel injector tubes to receive the cooling fuel. The outlet from the inner casing is provided at the rim end thereof.

Figure 2:
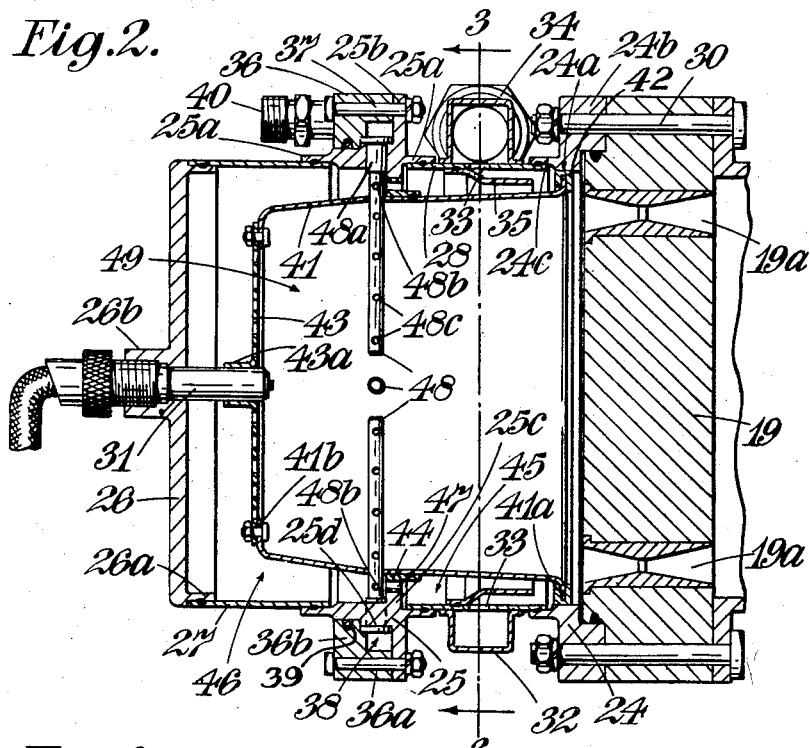
Figure 3:
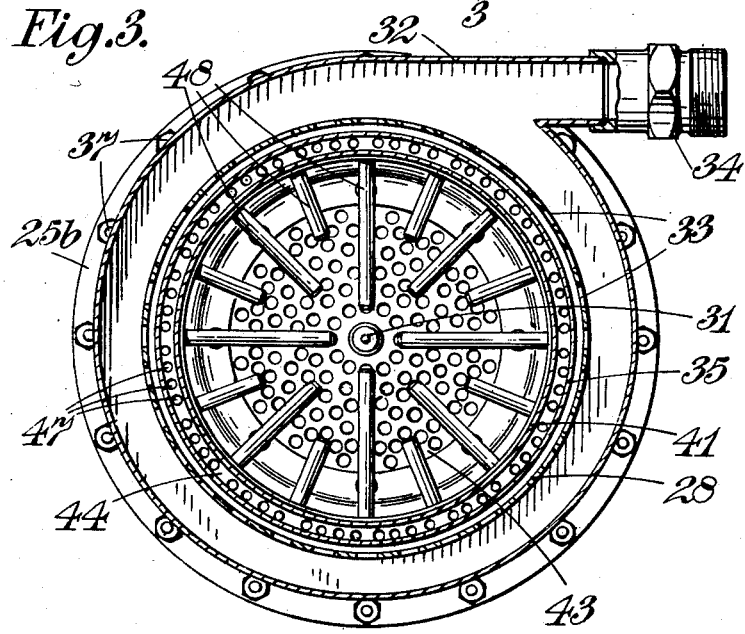

One embodiment of combustion starter of this invention will now be described with reference to the accompanying drawings in which Figure 1 illustrates the layout of the starter, Figure 2 illustrates in detail one construction of the combustion chamber, and Figure 3 is a section on the line 3—3 of Figure 2.

The combustion starter comprises a fuel tank 10 and an air bottle 11 containing air at, say, 3000 lbs./sq. in., and the air bottle is connected through a reducing valve 12, wherein the pressure is reduced to about 200 lbs./sq. in., to the fuel tank 10 to pressurize it. The air pressure in the tank 10, which is prevented from exceeding a selected value by relief valve 10a, delivers the fuel therefrom through a pipe 15 to the starter combustion chamber 14, and air is also delivered to the combustion chamber 14 through a pipe 16 containing a second reducing valve 18 which reduces the air pressure to about 150 lbs./sq. inch. A valve 13 is provided at the outlet of the air bottle 11, and the valve is actuated by a solenoid 13a which is energised and de-energised under the control of a time switch 13b, which limits the time for each starting sequence. The switch mechanism will also conveniently control the operation of engine and starter ignition means.

The fuel and air are thus conveyed separately to a combustion chamber, and in the chamber 14 part of the fuel is burnt with the air and the remainder of the fuel is used to cool the combustion products by vaporisation of the fuel. The combustion gases are delivered from the combustion chamber 14 through nozzles 19a in a nozzle plate 19 to a turbine 20. The turbine drives through gear mechanism 20a a clutch member 21 adapted to co-operate with a clutch member 22 to drive the engine 23 for starting purposes. The clutch member 21 is arranged to telescope towards the clutch member 22 when the turbine starts to rotate.

The combustion chamber (Figures 2 and 3) comprises an outer casing and an inner casing both of which are of cup-like form, the inner casing being accommodated within the outer casing with the plane of its mouth substantially in the same plane as the mouth of the outer casing and with its rim in sealing contact with the rim of the outer casing.

The outer casing comprises a pair of heavy metal rings 24, 25 of which the ring 24 forms the mouth or rim of the outer casing and of which the ring 25 is located at about the mid-length of the walls of the outer casing. The outer casing also comprises a heavy metal base 26 and the base is connected with the ring 25 by a tubular sheet-metal wall portion 27 and the two rings 24, 25 are interconnected by a second and similar sheet-metal wall portion 28.

The end metal ring 24 is formed internally with a cylindrical surface 24a to be engaged by the rim of the inner casing, has a radial flange 24b by which it is connected through bolts 30 with the nozzle plate 19 of the turbine structure, and the ring 24 also has an axial flange 24c by which it is attached to the adjacent sheet-metal wall portion 28 by welding.

The metal ring 25 has a pair of oppositely-directed axial flanges 25a by which it is attached to the sheet-metal wall portions 27, 28, has an outward radial flange 25b and an inward radial flange 25c, the inward radial flange being short relative to the flange 25b and having its inner surface cylindrical. The outer surface of the ring is formed with a cylindrical portion 25d and a number of bores extend radially through the portion 25d to the inner surface of the ring on the side of the short flange 25c away from the mouth of the outer casing.

The base 26 has an axial flange 26a by which it is attached to the corresponding sheet-metal wall portion 27 and is formed on its external surface centrally thereof with a boss 26b which is bored and threaded to form a socket for a spark plug 31.

The outer casing has manifolds formed integrally with it for distributing the air and the fuel in the combustion chamber.

The air manifold is formed by a channel-section sheet-metal structure 32 welded to the external surface of the sheet-metal wall portion 28 and this manifold communicates with the interior of the outer casing through a ring of holes 33 in the wall portion 28. A supply connection 34 extends tangentially from the sheet-metal channel structure 32 at a point around the periphery of the combustion chamber. A deflector 35 in the form of a joggled sheet-metal annulus is welded to the inner surface of the sheet-metal wall portion 28 so that air passing from the manifold 32 into the interior of the outer casing is constrained to flow first towards the metal ring 24 and then in the opposite direction towards the base 26.

The fuel manifold is formed by securing an L-section annular member 36 to the metal ring 25, the L-section annular member being secured by bolts 37 to the outward radial flange 25b so that it has an axially-extending flange 36a radially spaced from the cylindrical portion 25d of the ring 25 and so that it has a radial flange 36b which projects inwards into contact with the ring 25 on the side of the portion 25d remote from the outward flange 25b thus forming an annular fuel-distributing space 38, the inner wall of which is defined by the cylindrical portion 25d. A suitable seal 39 is provided between the radial flange 36b and the surface of the ring 25. A fuel supply union 40 is provided on the annular member 36 to receive the supply pipe 15 from the fuel tank 10.

The inner casing of the combustion chamber 14 has a sheet-metal wall 41 of frusto-conical form with a narrow outward flange 41a at its wider end and a narrow inward flange 41b at its narrower end. The outward flange 41a is stiffened by a metal ring 42 which forms the rim of the inner casing and when the inner casing is assembled within the outer casing locates the inner casing and co-operates in a gas-sealing manner with the cylindrical internal surface 24a of the metal ring 24. The inward flange 41b has secured to it a perforated sheet-metal base 43, formed centrally with a neck 43a which is aligned with and extends towards the socket 26b for the spark plug 31, and when the spark plug 31 is in position it projects through the base 26 of the outer casing across the space between the base 26 of the outer casing and the perforated base 43 into the neck 43a so that its spark gap is just within the inner casing.

At about its mid-length the sheet-metal wall 41 of the inner casing has secured to it a metal ring 44 which makes contact with the cylindrical internal surface of the inward flange 25c on the ring 25, thus dividing the space between the outer casing wall and the inner casing wall into two chambers 45 and 46. The metal ring 44 has a series of axial bores 47 extending through it to join the two chambers 45, 46.

The combustion chamber also comprises a number of fuel injectors in the form of perforated tubes 48 of different lengths and these tubes are fitted at their inlet ends with flanged ferrules 48a, the flanges of the ferrules seating on the cylindrical portion 25d of the ring 25 when the fuel injector tubes are placed in position by threading them through the radial bores in this ring, and being trapped by the annular member 36. The tubes have sufficient length to project across the chamber 46 between the walls of the inner and outer casings and well into the interior 49 of the inner casing, the wall of the inner casing being perforated to permit passage of the tubes. The perforations 48b, 48c in the tubes 48 are preferably arranged so that the fuel is injected in a direction transverse to the direction of gas flow through the combustion chamber and it is also arranged that the perforations 48b open into the chamber 46 between the walls of the inner and outer casings, whilst the perforations 48c open into the interior 49 of the inner casing at a position well spaced from the perforated base 43. The perforations 48c are substantially greater in number than the perforations 48b which open to the chamber 46.

In use, air and fuel are supplied simultaneously to the manifolds 32, 38, the air entering the chamber 45 and flowing towards the rim of the outer casing 24 and then reversing its direction of flow and flowing between the deflector 35 and the inner casing wall 41 and passing through the axial bores 47 in the ring 44, the jets of air emerging from the bores having injected into them sprays of fuel from the perforations 48b. It will be noted (Figure 3) that the bores 47 are preferably offset from the tubes 48. The fuel/air mixture then passes into the inner casing through the perforated base 43 where the mixture is ignited by the spark plug 31. The perforated base 43 serves as a combustion stabilizer, so that combustion of the air/fuel mixture occurs in the combustion space between the perforated base 43 and the fuel injector tubes 48, and further fuel is injected through the perforations 48c in the injector tubes into the combustion gases as they flow towards the outlet end of the inner casing and this additional fuel is carried downstream with the combustion products and is vaporised and thus cools the combustion products.

It is arranged by suitable selection of the pressure of the air supply and that in the fuel tank that the quantities of air and fuel supplied to the combustion space are such as to be approximately in the stoichiometric ratio and as a consequence the further fuel injected after combution provides a substantial excess of fuel.

For example the quantity of fuel injected through perforations 48b prior to combustion may be such that the air/fuel ratio is 15:1 and the quantity of further fuel may be sufficient to reduce the ratio to 3:1. It will be appreciated that by use of a number of fuel injectors 48 projecting substantially radially inwards, and having a number of holes along their length, the excess fuel may be distributed fairly evenly amongst the combustion gases, and thus local "hot spots" are avoided.

The cooled combustion gases then flow through the turbine 20 to drive it. It will be appreciated that the turbine might be replaced by a suitable piston-type or other motor, and the turbine and other suitable motors will be understood to be comprised in the term "thermo-mechanical transducer." Such a transducer will be provided with means, which are in themselves well known, for engaging the dogs 21, 22 when a cranking torque is initiated, and for disengaging the dogs when the engine starts and the cranking torque ceases to be transmitted.

It is found that with the arrangement of this invention, not only can the pressure air from the air bottle 11 be used economically but also a substantial decrease in the operating temperatures of the parts, particularly of the turbine or other motor 20, is obtained with a consequent increase in the life of the parts. The arrangement of the invention also permits repeated starts to be made if necessary.

We claim:

A combustion starter comprising a combustion chamber including an outer cup-like casing, an inner cup-like casing nested within said outer casing, said casings each having a base portion and a side wall portion, the base portions and side wall portions of the casings being spaced apart from one another to define a space therebetween, and said casings having rims in sealed engagement, and means to supply fuel and air to said combustion chamber in approximately the stoichiometric ratio comprising an air manifold secured to said outer casing and connected to said space adjacent the rims to feed air thereto, a fuel manifold secured to the outer casing adjacent its midlength, and a plurality of tubes extending radially from the fuel manifold across said space between the side walls and projecting within the inner casing, said tubes being formed with a first set of perforations in their portions between the walls and a second set of perforations in their portions within the inner casing, and the base of the inner casing being perforated, the air flowing from said air manifold through said space between the walls past said first set of perforations to receive combustion fuel and then turning into a reverse path to pass into the inner casing through its perforated base, which acts as a combustion stabiliser, so that in the inner casing combustion occurs at the base end and the combustion products flow past the second set of perforations, the further fuel there injected serving to cool said combustion products, a thermo-mechanical transducer, and means to conduct the cooled combustion products to said transducer.

References Cited in the file of this patent

UNITED STATES PATENTS

| | | |
|---|---|---|
| 2,016,921 | Goddard | Oct. 8, 1935 |
| 2,511,385 | Udale | June 13, 1950 |
| 2,643,511 | Briggs | June 30, 1953 |
| 2,676,456 | Holzwarth | Apr. 27, 1954 |
| 2,780,915 | Karen | Feb. 12, 1957 |
| 2,812,637 | Fox | Nov. 12, 1957 |